(12) United States Patent
Liu et al.

(10) Patent No.: US 8,385,478 B1
(45) Date of Patent: Feb. 26, 2013

(54) CHANNEL ESTIMATION METHOD AND DEVICE USING THE SAME

(75) Inventors: Chun-Hao Liu, Taipei (TW);
Chun-Hsiung Chuang, Hsinchu (TW);
Chi-Tien Sun, Hsinchu (TW);
Shun-Chang Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/309,971

(22) Filed: Dec. 2, 2011

(30) Foreign Application Priority Data

Aug. 23, 2011 (TW) .............................. 100130179 A (51) Int. Cl.
*H04L 27/06* (2006.01)
(52) U.S. Cl. .... 375/340; 375/350; 455/63.1; 455/67.11; 370/252
(58) Field of Classification Search ............... 375/144, 375/148, 229, 232, 260, 285, 340, 346, 347, 375/349, 350; 455/63.1, 65, 67.11, 226.1, 455/226.3, 296, 307; 370/491, 497, 500, 370/252, 464, 465
See application file for complete search history.

(56) References Cited

U.S. PATENT DOCUMENTS

| 7,995,688 B2 * | 8/2011 | Hong et al. ................. 375/346 |
| 8,229,036 B2 * | 7/2012 | Kolze ............................ 375/340 |
| 2011/0164709 A1 * | 7/2011 | Park et al. .................... 375/346 |

* cited by examiner

*Primary Examiner* — Dac Ha
(74) *Attorney, Agent, or Firm* — McClure, Qualey & Rodack, LLP (57) ABSTRACT

A channel estimation method is provided. The method includes the following steps of: receiving an input symbol of an input signal and obtaining several pilot channel gains through calculation; executing an operation of interpolation on the pilot channel gains by a Wiener filter to obtain several data channel gains through calculation; calculating an adaptive alteration for the first and second multi-path statistical characteristic parameters according to the data channel gains and the pilot channel gains, and accordingly having the first and the second multi-path statistical characteristic parameters adjusted; generating an updated Wiener filter according to the adjusted first and second multi-path statistical characteristic parameters to execute an operation of channel estimation on a next input symbol of the input signal.

15 Claims, 4 Drawing Sheets

CHANNEL ESTIMATION METHOD AND DEVICE USING THE SAME

This application claims the benefit of Taiwan application Serial No. 100130179 filed Aug. 23, 2011, the disclosure of which is incorporated by reference herein in its entirety.

BACKGROUND

1. Technical Field

The disclosed embodiments relate in general to a channel estimation method with channel adaptation and a device using the same.

2. Description of the Related Art

Of the existing technologies, the orthogonal frequency division multiplexing (OFDM) technology is frequently used in various wireless communication protocols (such as worldwide interoperability for microwave access (WiMAX) or the 3rd generation partnership project-long term evolution (3GPP-LTE)) for the data transmission of physical layer. In general, the OFDM receiver executes an operation of channel estimation according to the pilot channel gains by using the interpolation technology.

However, in the occasions of high-speed movement, the Doppler effect will destroy the orthogonal properties between the sub-carriers used in the OFDM technology, and may further incur inter-carrier interference (ICI). In addition, the occasions of high-speed movement radically change the power delay profile (PDP) of the channel, so that the results obtain by the channel estimation method according to the interpolation technology are no more reliable. Consequently, in occasions of high-speed movement, the existing OFDM system may face the problem of deterioration in the efficiency of the entire system.

SUMMARY

The disclosure is directed to a channel estimation method with channel adaptation and a device using the same. An input symbol is received, and an operation of channel estimation is executed by a Wiener filter according to the pilot channel gains corresponding to the pilot signal of the input symbol. According to the channel estimation method with channel adaptation and the device using the same related to the disclosure, an adaptive alteration for the first and second multi-path statistical characteristic parameters of a Wiener filter is further calculated according to the above channel estimation result and the pilot channel gains, and an updated Wiener filter is generated accordingly. An operation of channel estimation is executed on a next input symbol according to the updated Wiener filter, so that the Wiener filter used for channel estimation can be adjusted according to the input signal and existing channel conditions and adapted to rapid change in channel characteristics in the occasions of high-speed movement. An adaptive adjustment is executed on the operation of channel estimation in response to rapid change in channel characteristics in the occasions of high-speed movement to achieve superior efficiency of the entire system.

The disclosure provides a channel estimation method with channel adaptation for receiving an input signal having several input symbols each having several pilot signals. The channel estimation method includes the following steps. Firstly, an n-th input symbol of an input signal is received, and several pilot channel gains are obtained by calculating several pilot channels transmitting the pilot signals of the n-th input symbol, wherein n is a natural number. Next, an operation of interpolation is executed on the pilot channel gains by a Wiener filter to obtain several data channel gains, corresponding to several data channels transmitting several respective data signals of the n-th input symbol. Then, an adaptive alteration for the first and second multi-path statistical characteristic parameters is calculated according to the data channel gains and the pilot channel gains, and the first and the second multi-path statistical characteristic parameters are adjusted accordingly. Then, an updated Wiener filter is generated according to the adjusted first and second multi-path statistical characteristic parameters. Afterwards, following the step of generating the updated Wiener filter, the value of n is increased by 1 and the step of channel estimation is repeated so that an operation of channel estimation is executed on a next input symbol of the input signal.

The disclosure discloses a channel estimation device with channel adaptation for receiving an input signal having several input symbols each having several pilot signals. The channel estimation device includes a reception unit, a channel estimation unit and a channel adaptation parameter tracking unit. The reception unit receives an n-th input symbol of an input signal, wherein n is a natural number. The channel estimation unit obtains several pilot channel gains by calculating several pilot channels transmitting the pilot signals of the n-th input symbol. The channel estimation unit further includes a Wiener filter for executing an operation of interpolation on the pilot channel gains to obtain several data channel gains, corresponding to a plurality of data channels transmitting a plurality of respective data signals of the n-th input symbol. The channel adaptation parameter tracking unit calculates an adaptive alteration for the first and second multi-path statistical characteristic parameters according to the data channel gains and the pilot channel gains, and accordingly adjusts the first and the second multi-path statistical characteristic parameters. The channel estimation unit generates an updated Wiener filter according to the adjusted first and second multi-path statistical characteristic parameters to execute an operation of channel estimation on the (n+1)-th input symbol.

The above and other aspects of the disclosure will become better understood with regard to the following detailed description of the non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The channel estimation device with channel adaptation of the present embodiment calculates an adaptive alteration for multi-path statistical characteristic parameters of a Wiener filter according to the channel estimation result and the pilot channel gains, and accordingly generates an updated Wiener filter for executing an operation of channel estimation on a next input symbol of the input signal.

Figure 1:
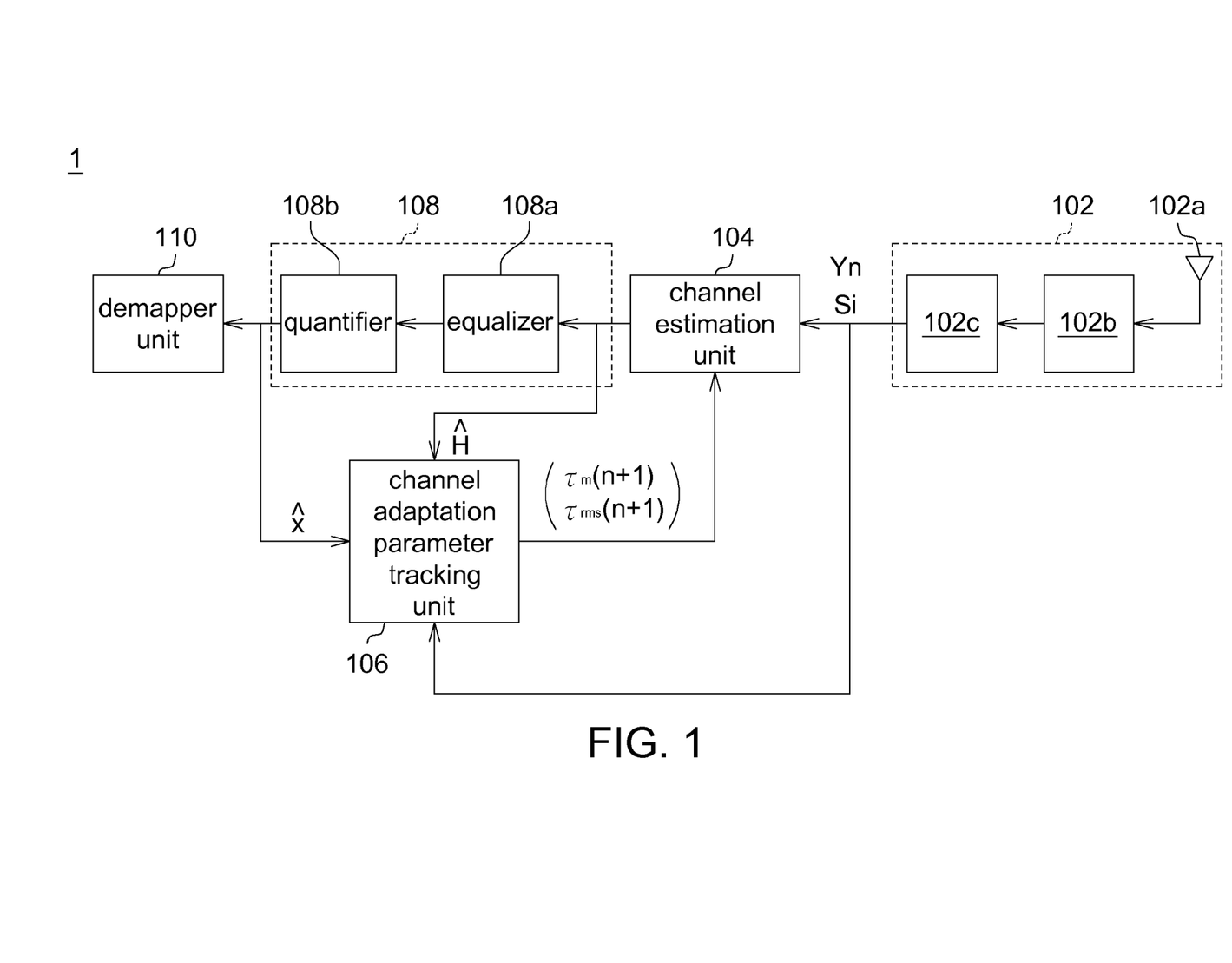
FIG. 1 shows a block diagram of a channel estimation device with channel adaptation according to an embodiment.

Referring to FIG. 1, a block diagram of a channel estimation device with channel adaptation according to an embodiment is shown. The channel estimation device with channel adaptation 1 receives an input signal Si including several input symbols of serial transmission and accordingly executing an operation of channel estimation to obtain a restored data X through restoration respectively, wherein each input symbol includes several pilot signals. For example, each input symbol includes 1024 signals inclusive of 128 pilot signals.

The operation of channel estimation executed by the channel estimation device 1 according to each input symbol of the input signal Si and obtains each restored data through restoration is substantially the same for all input symbols, and such operation is exemplified below by the operation of executing channel estimation by the channel estimation device 1 according to the n-th input symbol Yn and the operation of obtaining a corresponding restored data Xn, wherein n is a natural number.

The channel estimation device 1 includes a reception unit 102, a channel estimation unit 104, a channel adaptation parameter tracking unit 106, an equalizing/quantifying unit 108 and a demapper unit 110. The reception unit 102 receives a wireless signal Sr and provides an input signal Si accordingly. For example, the reception unit 102 includes an antenna 102a, a cyclic prefix remover 102b and a fast Fourier transformer 102c. The antenna 102a receives a wireless signal Sr. The cyclic prefix remover 102b receives and outputs the wireless signal Sr. The fast Fourier transformer 102c generates and provides an input symbol Yn according to the wireless signal Sr provided by the cyclic prefix remover 102b. Thus, the channel estimation device 1 executes related operation of channel estimation in a frequency domain.

The channel estimation unit 104 obtains several pilot channel gains by calculating several pilot channels transmitting the pilot signals of the input symbol Yn. For example, the channel estimation unit 104 further includes a Wiener filter. The channel estimation unit 104 executes an operation of interpolation on the pilot channel gains according to the linear minimum mean squared error (LMMSE) algorithm to obtain several data channel gains by respectively calculating several data channels transmitting several data signals of the input symbol Yn. The channel estimation unit 104 outputs the estimated data channel gains to the channel adaptation parameter tracking unit 106. For example, the data channel estimation result outputted by the channel estimation unit 104 can be expressed by a data channel gain vector $\hat{H}$.

Furthermore, the operation of the Wiener filter can be expressed as the following formula (1):

$$\hat{H} = W_d^H \times \tilde{H}_p \quad (1)$$

Wherein, $W_d^H$ denotes a conjugate transpose matrix of the Wiener filter matrix $W_d$; $\tilde{H}_p$ denotes a pilot channel gain vector; $\hat{H}$ denotes an estimated data channel gain vector.

For example, the Wiener filter matrix $W_d$ can be expressed according to the following formula (2):

$$W_d = (R_p + \sigma_n^2 I)^{-1} r_{dp} \quad (2)$$

Wherein, $R_p$ denotes an auto-correlation matrix $E\{H_p H_p^H\}$; $r_{dp}$ denotes a cross-correlation matrix $E\{H_p H_d^*\}$; I denotes a unit matrix; $\sigma_n^2$ denotes a noise variance.

In an example, the uniform distribution power delay profile (PDP) model is applied for estimating the auto-correlation matrix and the cross-correlation matrix related to frequency. For example, the frequency related formula following the Fourier transformation is expressed as the following formula (3):

$$R_{f,uniform}[\Delta f] = e^{-j2\pi\tau_m \Delta f} sinc(T\Delta f) \quad (3)$$

Wherein, the sinc(T$\Delta$f) satisfies formula (4):

$$sinc(T\Delta f) = \frac{sin(\pi x)}{(\pi x)} \quad (4)$$

Parameter $\tau_m$ and T respectively satisfy formulas (5) and (6):

$$\tau_m = \tau_0 + \frac{T}{2} \quad (5)$$

$$T = \sqrt{12\tau_{rms}} \quad (6)$$

Wherein parameters $\tau_m$ and $\tau_{rms}$ respectively denote the average value and the mean squared root of delay corresponding to respective transmission path in a multiple transmission path environment. In other words, the parameters $\tau_m$ and $\tau_{rms}$ can be viewed as the statistical characteristics parameters of the multi-path environment for the current transmission system.

In another example, the existing exponential distribution PDP model is applied for estimating the auto-correlation matrix and the cross-correlation matrix related to frequency. For example, the frequency related formula following Fourier transformation is expressed as the following formula (7):

$$R_{f,uniform}[\Delta f] = \frac{e^{-j2\pi\tau_0 \Delta f}}{1 + j2\pi\tau_{rms} \Delta f} \quad (7)$$

Wherein $\tau_0$ satisfies formula (8):

$$\tau_0 = \tau_m - \tau_{rms} \quad (8)$$

In other words, the Wiener filter matrix $W_d$ is a function using parameters $\tau_m$ and $\tau_{rms}$ as variables.

The data channel gain vector $\hat{H}$ provided by the channel estimation unit 104 is further provided to the equalizing/quantifying unit 108, which accordingly obtains a signal $\hat{X}$ through restoration. For example, the equalizing/quantifying unit 108 includes an equalizer 108a and a quantifier 108b, respectively executing equalization and quantification operations.

The demapper unit 110 receives the restored signal $\hat{X}$ obtained by the equalizing/quantifying unit 108, and accordingly generates a soft bit signal.

The channel adaptation parameter tracking unit 106 calculates an adaptive alteration for the multi-path statistical characteristic parameters $\tau_m$ and $\tau_{rms}$ according to the estimated channel gain vector $\hat{H}$. For example, the channel adaptation parameter tracking unit 106 locates a channel estimation error e according to the difference between the actual data channel gain vector $H_d$ and the estimated data channel gain vector $\hat{H}$ and accordingly generates a square absolute value function J of channel estimation error e. Since the actual data channel gain vector $H_d$ is given, the estimated data channel gain vector $\hat{H}$ satisfies formula (1) (that is, the product of the Wiener filter matrix W multiplied by the pilot channel gain vector wherein $\tilde{H}_p$), and the Wiener filter matrix W is a function of multi-path statistical characteristic parameters $\tau_m$ and $\tau_{rms}$, and the square absolute value function J of channel estimation error e is also the function of the multi-path statistical characteristic parameters $\tau_m$ and $\tau_{rms}$.

The channel adaptation parameter tracking unit 106 further approximates the optimum solution of the multi-path statistical characteristic parameters $\tau_m$ and $\tau_{rms}$ according to the square absolute value function J with respect to the maximum value of the gradient of multi-path statistical characteristic parameters $\tau_m$ and $\tau_{rms}$.

Furthermore, the channel estimation error e and the square absolute value function J respectively satisfy formula (9) and formula (10):

$$e = H_d - \hat{H} = H_d - W \times \tilde{H}_P \quad (9)$$

$$J = \|e\|^2 = \|H_d - W \times \tilde{H}_P\|^2 \quad (10)$$

For example, the channel adaptation parameter tracking unit 106 estimates the actual data channel gain vector $H_d$ according to the following formula (11):

$$H_d = \frac{Y_n}{\hat{X}} \quad (11)$$

The gradient operator of the square absolute value function J with respect to multi-path statistical characteristic parameters $\tau_m$ and $\tau_{rms}$ can be expressed as formula (12):

$$\nabla J(\tau_m, \tau_{ms}) = \begin{bmatrix} \left(-\tilde{H}_d^H W_m \tilde{H}_p - \left(W_m \tilde{H}_p\right)^H \tilde{H}_d + \right. \\ \left. \left(W \tilde{H}_p\right)^H W_m \tilde{H}_p + \left(W_m \tilde{H}_p\right)^H W \tilde{H}_p\right) \\ \left(-\tilde{H}_d^H W_{rms} \tilde{H}_p - \left(W_{rms} \tilde{H}_p\right)^H \tilde{H}_d + \right. \\ \left. \left(W \tilde{H}_p\right)^H W_{rms} \tilde{H}_p + \left(W_{rms} \tilde{H}_p\right)^H W \tilde{H}_p\right) \end{bmatrix} \quad (12)$$

Wherein $W_m$ is defined as $$\partial W / \partial \tau_m,$$

and $W_{rms}$ is defined as $$\partial W / \partial \tau_{rms}.$$

After the square absolute value function J is calculated, the following formula (13) can be obtained:

$$\begin{bmatrix} \tau_m(n+1) \\ \tau_{rms}(n+1) \end{bmatrix} = \begin{bmatrix} \tau_m(n) \\ \tau_{rms}(n) \end{bmatrix} - \Lambda \cdot \nabla J(\tau_m(n), \tau_{rms}(n)) \quad (13)$$

Wherein $\Lambda$ satisfies the following formula (14):

$$\Lambda = \begin{bmatrix} \lambda_m & 0 \\ 0 & \lambda_{rms} \end{bmatrix} \quad (14)$$

Wherein $\lambda_m$ and $\lambda_{rms}$ are constants. Thus, the channel adaptation parameter tracking unit 106 provides adjusted multi-path statistical characteristic parameters $\tau_m(n+1)$ and $\tau_{rms}(n+1)$ to the channel estimation unit 104. The channel estimation unit 104 accordingly generates an updated Wiener filter, and executes an operation of channel estimation on a next input symbol Yn+1 of the input signal Si.

Figure 2:
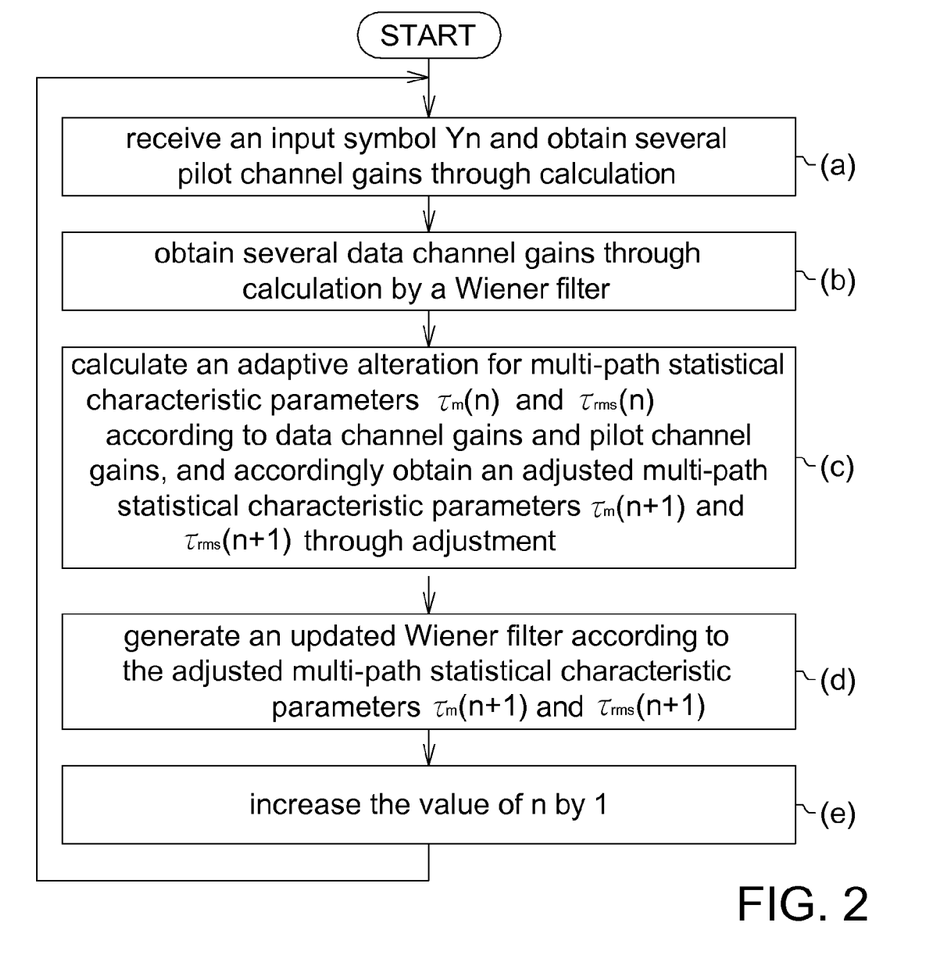
FIG. 2 shows a flowchart of a channel estimation method with channel adaptation according to an embodiment.

Referring to FIG. 2, a flowchart of a channel estimation method with channel adaptation according to an embodiment is shown. The channel estimation method of the present embodiment includes the following steps. Firstly, the method begins at step (a), an input symbol Yn is received by the reception unit 102, and several pilot channel gains are obtained by calculating several pilot channels transmitting the pilot signals of the input symbol Yn, wherein the pilot channel gains can be expressed as a vector $\tilde{H}_p$. Then, the method proceeds to step (b), a Wiener filter is applied by the channel estimation unit 104 for executing an operation of interpolation on the pilot channel gains to obtain several data channel gains, corresponding to a plurality of data channels transmitting a plurality of respective data signals of the n-th input symbol Yn, wherein the data channel gains can be expressed as a vector $\hat{H}$.

Then, the method proceeds to step (c), an adaptive alteration for multi-path statistical characteristic parameters $\tau_m(n)$ and $\tau_{rms}(n)$ is calculated by the channel adaptation parameter tracking unit 106 according to the data channel gain vector $\hat{H}$ and the pilot channel gain vector $\tilde{H}_p$, and an adjusted multi-path statistical characteristic parameters $\tau_m(n+1)$ and $\tau_{rms}(n+1)$ is obtained through adjustment.

Afterwards, the method proceeds to step (d), an updated Wiener filter is generated by the channel estimation unit 104 according to the adjusted multi-path statistical characteristic parameters $\tau_m(n+1)$ and $\tau_{rms}(n+1)$. Then, the method proceeds to step (e), the value of n is increased by 1 and steps (a) and (b) are repeated, so that an operation of channel estimation is executed on a next input symbol of the input signal Yn+1 by the channel estimation unit 104 according to the updated Wiener filter.

Figure 3:
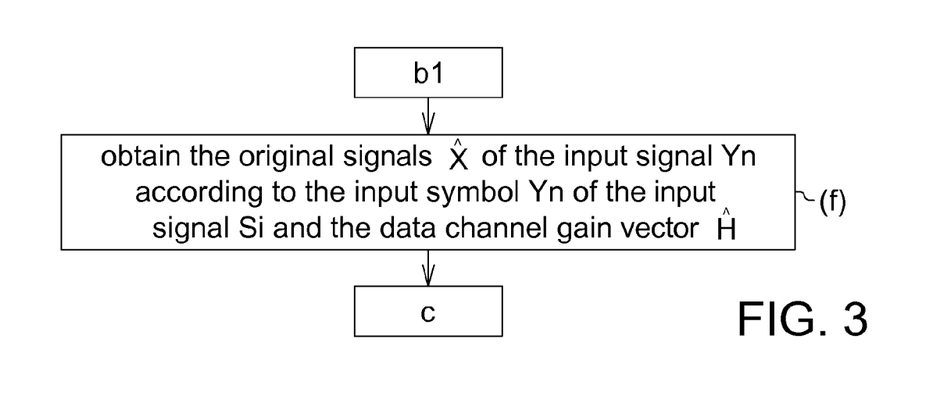
FIG. 3 shows a partial flowchart of a channel estimation method with channel adaptation according to an embodiment.

Referring to FIG. 3, a partial flowchart of a channel estimation method with channel adaptation according to an embodiment is shown. In an example, the channel estimation method of the present embodiment further includes step (f) between steps (b) and (c), the original signals $\hat{X}$ of the input signal Yn is obtained by the equalizer/quantifier 108 according to the input symbol Yn of the input signal Si and the data channel gain vector $\hat{H}$ through restoration.

Figure 4:
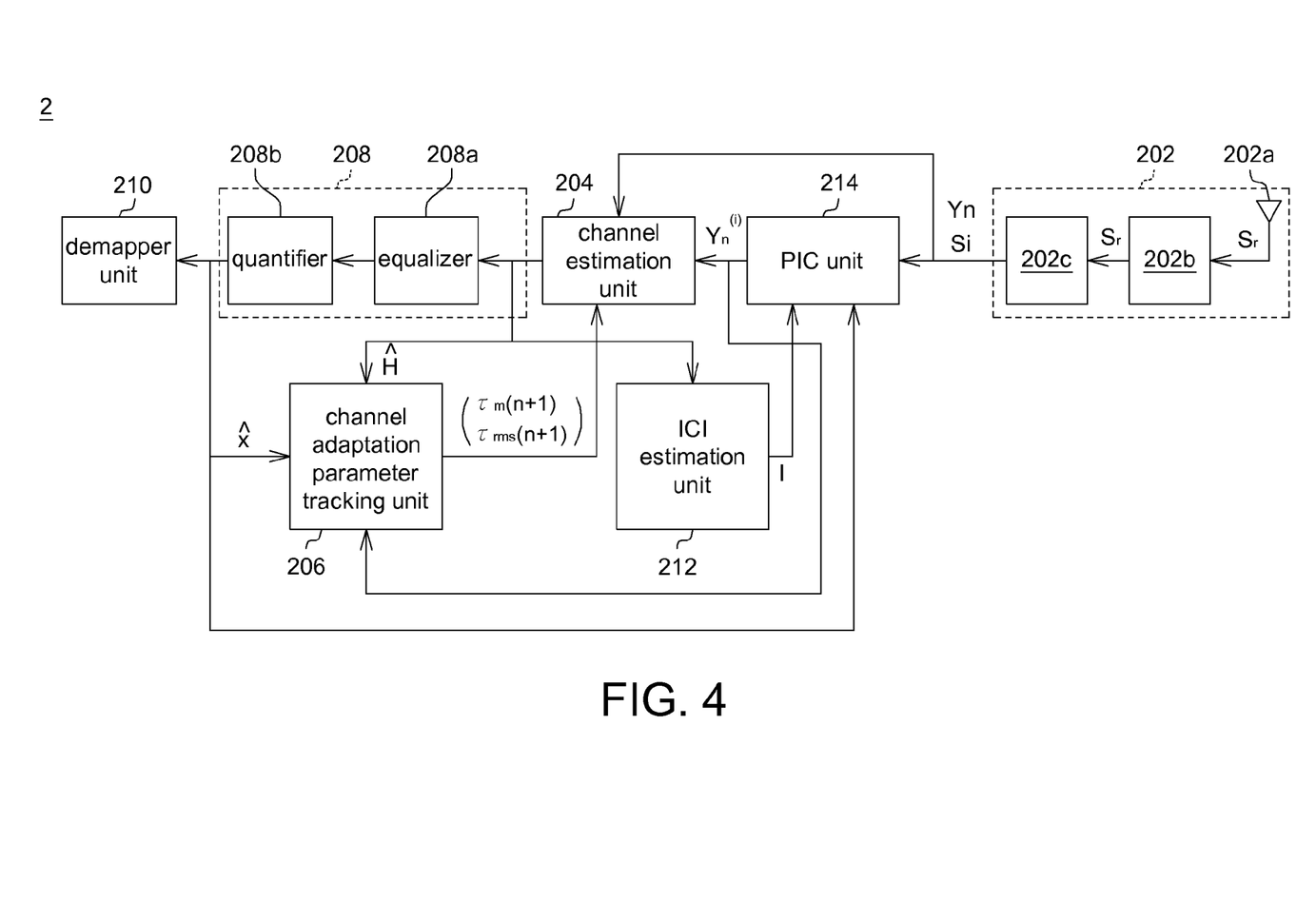
FIG. 4 shows a block diagram of a channel estimation device with channel adaptation according to another embodiment.

Referring to FIG. 4, a block diagram of a channel estimation device with channel adaptation according to another embodiment is shown. The channel estimation device 2 of the present embodiment is different form the channel estimation device 1 of the first embodiment in that the channel estimation device 2 further includes an inter-carrier interference (ICI) estimation unit 212 and a parallel interference cancellation (PIC) unit 214 for executing an iteration of ICI cancellation on the input symbol Yn.

Furthermore, the ICI estimation unit 212 executes an operation of ICI estimation according to the pilot channel gain vector $\tilde{H}_p$ and the data channel gain vector $\hat{H}$ to locate the ICI gain I for each pilot channel and each data channel. The PIC unit 214 executes a PIC operation on each pilot channel and each data channel according to the ICI gain I corresponding to each pilot channel and each data channel to locate interference cancelled input symbol Yn$^{(i)}$, wherein the parameter i indicates the number of times of the iteration of ICI cancellation, and is such as a natural number ranging between 1 and a predetermined number of times i_max, which can be realized by any natural number larger than or equal to 1.

The interference cancelled input symbol Yn$^{(i)}$ is further provided to the channel estimation unit 204, so that the channel estimation unit 204 again executes an operation of channel estimation to locate the data channel gain vector $\hat{H}$. Then, the ICI estimation unit 212 and the PIC unit 214 again execute a PIC operation on each pilot channel and each data channel according to the ICI gain I corresponding to each pilot channel and each data channel to locate an input symbol Yn$^{(i+1)}$ in which the interference is cancelled. In other words, the ICI estimation unit 212, the PIC unit 214 and the channel estimation unit 204 form an iteration path to continuously execute an iteration of ICI cancellation on the input symbol Yn. After a predetermined number of times of iteration, the above unit skips the iteration path, and outputs a data channel gain vector $\hat{H}$ in which the ICI is cancelled.

In greater details, the ICI estimation unit 212 estimates the ICI gain l[k, k+d] resulted in the k-th sub-carrier channel by the (k+d)-th sub-carrier channel according to the following formula (15):

$$I[k, k+d] = \frac{-h'[k]}{1 - e^{j\frac{2\pi}{N}d}} \quad (15)$$

Wherein h'[k] denotes a slope distribution of the k-th sub-carrier channel, and k and d both are a natural number.

For example, the ICI estimation unit 212 of the present embodiment of the invention simplifies formula (15) as formula (17) with reference to the formula (16) to simplify the estimation of l[k,k+d]:

$$\alpha = \frac{2\pi d}{N} \quad (16)$$

$$I[k, k+d] \approx \frac{-h'[k]}{2} - j\frac{-h'[k]}{\alpha} \quad (17)$$

For the PCI unit 214, the operation can be expressed as the following formula (18):

$$Yn^{(i+1)}[k] = Yn^{(0)}[k] - \sum_{m=-d, m \neq 0}^{d} \hat{I}[k, k+m] \times \hat{X}[k+m] \quad (18)$$

Wherein parameter i denotes the number of times of iteration, and the limit of the parameter i is a predetermined value, which determines the number of times of iteration, $\hat{I}[,k+m]$ denotes the estimate of ICI gain resulted in the k-th sub-carrier channel by the (k+m)-th sub-carrier, and $\hat{X}[k+m]$ denotes a restored data.

Figure 5:
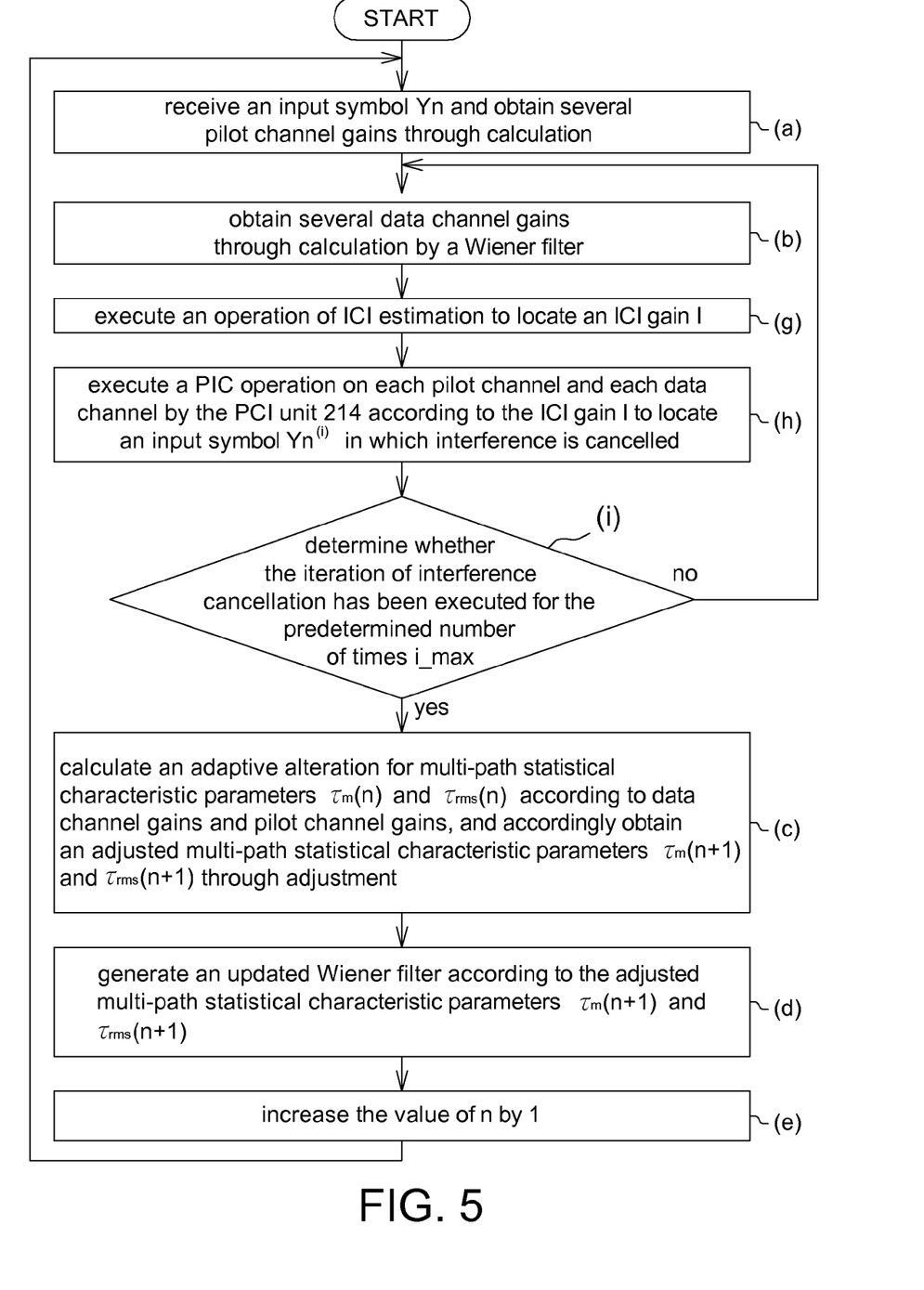
FIG. 5 shows a flowchart of a channel estimation method with channel adaptation according to another embodiment.

Referring to FIG. 5, a flowchart of a channel estimation method with channel adaptation according to another embodiment is shown. The channel estimation method of the present embodiment is different from the channel estimation method of the first embodiment in that steps (g), (h) and (i) are further included between steps (b) and (c) to implement the aforementioned iteration of ICI cancellation.

Furthermore, after the data channel gain vector $\hat{H}$ is located, the channel estimation method proceeds to step (g), an operation of ICI estimation is executed by the ICI estimation unit 212 according to the pilot channel gain vector $\hat{H}_p$ and the data channel gain vector $\hat{H}$ to locate an ICI gain I for each pilot channel and each data channel. For example, the ICI gain I[k,k+d] resulted in the k-th sub-carrier channel by the (k+d)-th sub-carrier channel can be expressed as formula (15).

Then, the method proceeds to step (h), a PIC operation is executed on each pilot channel and each data channel by the PCI unit 214 according to the ICI gain I to locate an input symbol Yn$^{(i)}$ in which interference is cancelled. After that, the method proceeds to step (i), whether the iteration of interference cancellation has been executed for the predetermined number of times i_max is determined by the channel estimation unit 204 according to whether the parameter i is equal to the predetermined number of times i_max. If not, the channel estimation unit 204 again calculates the data channel gain vector $\hat{H}$ according to the input symbol Yn$^{(i)}$, in which interference is cancelled, and provides the data channel gains to the ICI estimation unit 212 for executing the iteration of interference cancellation again.

When the parameter i is equal to the predetermined number of times i_max, the channel estimation unit 204 provides the data channel gain vector $\hat{H}$ to the channel adaptation parameter tracking unit 206. In other words, the channel estimation method sequentially executes steps (c)~(e) to complete the remaining operations of the channel estimation method. The details of steps (c)~(e) are similar to corresponding steps of the channel estimation method of the first embodiment, and the similarities are not repeated here.

According to the channel estimation method with channel adaptation and the device using the same disclosed in the above embodiments, an input symbol is received, and an operation of channel estimation is executed by a Wiener filter according to the pilot channel gains corresponding to the pilot signal of the input symbol. An adaptive alteration for the first and the second multi-path statistical characteristic parameters of the Wiener filter is calculated according to the aforementioned channel estimation result and the pilot channel gains, and an updated Wiener filter is generated accordingly. An operation of channel estimation is executed on a next input symbol according to the updated Wiener filter, so that the Wiener filter used for channel estimation can be adjusted according to the input signal and existing channel conditions and adapted to rapid change in channel characteristics in the occasions of high-speed movement. Compared to the conventional channel estimation method, the channel estimation method with channel adaptation and the device using the same disclosed in above embodiments can execute adaptive adjustment on the operation of channel estimation in response to rapid change in channel characteristics in the occasions of high-speed movement to achieve superior efficiency of the entire system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A channel estimation method with channel adaptation for receiving an input signal comprising a plurality of input symbols each comprising a plurality of pilot signals, wherein the channel estimation method comprises:

receiving an n-th input symbol of the input signal, and obtaining a plurality of the pilot channel gains by calculating a plurality of pilot channels transmitting the pilot signals of the n-th input symbol, wherein n is a natural number;

executing an operation of interpolation on the pilot channel gains by a Wiener filter to obtain a plurality of data channel gains, corresponding to a plurality of data channels transmitting a plurality of respective data signals of the n-th input symbol;

calculating an adaptive alteration for a first and a second multi-path statistical characteristic parameters according to the data channel gains and the pilot channel gains, and accordingly having the first and the second multi-path statistical characteristic parameters adjusted;

generating an updated Wiener filter according to the adjusted first and second multi-path statistical characteristic parameters; and after generating the updated Wiener filter, increasing the value of n by 1 and repeating the operation of channel estimation to execute an operation of channel estimation on a next input symbol of the input signal.

2. The channel estimation method according to claim 1, wherein after obtaining the pilot channel gains and the data channel gains through calculation, the channel estimation method further comprises:

executing an inter-carrier interference (ICI) estimation operation according to the pilot channel gains and the data channel gains to locate an ICI gain for each pilot channel and each data channel; and executing a parallel interference cancellation (PIC) operation on each pilot channel and each data channel according to the ICI gain corresponding to each pilot channel and the data channels to locate the n-th input symbol in which the interference is cancelled.

3. The channel estimation method according to claim 2, wherein after locating the n-th input symbol in which the interference is cancelled, the channel estimation method further repeats the step of obtaining the pilot channel gains and the data channel gains through calculation to execute an iteration of interference cancellation on the n-th input symbol.

4. The channel estimation method according to claim 3, wherein after locating the n-th input symbol in which the interference is cancelled, the method further comprises:

determining whether the iteration of interference cancellation has been executed for a predetermined number of times: if not, repeating the step of calculating the data channel gains to execute the iteration of interference cancellation again.

5. The channel estimation method according to claim 1, after obtaining the pilot channel gains and the data channel gains through calculation, the method further comprises:

obtaining a plurality of original signals of the input signal through restoration according to the input signal and the data channel gains.

6. The channel estimation method according to claim 1, wherein the first multi-path statistical characteristic parameter is related to a multi-path average delay, and the second multi-path statistical characteristic parameter is related to a multi-path delay mean squared root.

7. The channel estimation method according to claim 6, wherein the generation of the updated Wiener filter is implemented by the following equation:

$$\begin{bmatrix} \tau_m(n+1) \\ \tau_{rms}(n+1) \end{bmatrix} = \begin{bmatrix} \tau_m(n) \\ \tau_{rms}(n) \end{bmatrix} - \Lambda \times \nabla J(\tau_m(n), \tau_{rms}(n))$$

$\tau_m(n)$ and $\tau_{rms}(n)$ respectively correspond to the first and the second multi-path statistical characteristic parameters of the n-th input symbol, $\tau_m(n+1)$ and $\tau_{rms}(n+1)$ respectively correspond to the first and the second multi-path statistical characteristic parameters of a next input symbol, and $\Lambda \times \Delta J(\tau_m(n),\tau_{rms}(n))$ denotes the adaptive alteration;

wherein, $\Lambda$ denotes a variation step unit of the first and second multi-path statistical characteristic parameters, and can be expressed as the following matrix:

$$\Lambda = \begin{bmatrix} \lambda_m & 0 \\ 0 & \lambda_{rms} \end{bmatrix}$$

wherein, $\nabla J(\tau_m(n),\tau_{rms}(n))$ denotes the gradient of the function $J(\tau_m(n),\tau_{rms}(n))$ corresponding to $\tau_m(n)$ and $\tau_{rms}(n)$, and the function $J(\tau_m(n),\tau_{rms}(n))$ satisfies the following formula:

$$J(\tau_m,\tau_{rms}) = \|e\|^2 = \|H_d - W\tilde{H}_p\|^2$$

$H_d$ denotes an actual data channel gain vector, $\tilde{H}_p$ denotes a pilot channel gain vector, and W denotes the Wiener filter matrix.

8. A channel estimation device with channel adaptation for receiving an input signal comprising a plurality of input symbols each comprising a plurality of pilot signals, wherein the channel estimation device comprises:

a reception unit for receiving an n-th input symbol of the input signal, wherein n is a natural number;

a channel estimation unit for obtaining a plurality of pilot channel gains by calculating a plurality of pilot channels transmitting the pilot signals of the n-th input symbol, wherein the channel estimation unit further comprises:

a Wiener filter for executing an operation of interpolation on the pilot channel gains to obtain a plurality of data channel gains, corresponding to a plurality of data channels transmitting a plurality of respective data signals of the n-th input symbol; and a channel adaptation parameter tracking unit for calculating an adaptive alteration for a first and a second multi-path statistical characteristic parameters according to the data channel gains and the pilot channel gains, and accordingly having the first and the second multi-path statistical characteristic parameters adjusted;

wherein, the channel estimation unit generates an updated Wiener filter according to the adjusted first and second multi-path statistical characteristic parameters to execute an operation of channel estimation on an (n+1)-th input symbol.

9. The channel estimation device according to claim 8, further comprising:

an inter-carrier interference (ICI) estimation unit for executing an ICI estimation operation according to the pilot channel gains and the data channel gains to locate an ICI gain for each pilot channel and each data channel; and a parallel interference cancellation (PIC) unit for executing a PIC operation on each pilot channel and each data channel according to the ICI gain corresponding to each pilot channel and the data channels to locate the n-th input symbol in which the interference is cancelled.

10. The channel estimation device according to claim 9, wherein n-th input symbol in which the interference is cancelled is further provided to the channel estimation unit for executing an iteration operation on the n-th input symbol.

11. The channel estimation device according to claim 10, wherein the channel estimation unit further determines whether the iteration of interference cancellation has been executed for a predetermined number of times;

wherein, if the iteration of interference cancellation has not been execute the predetermined number of times, the channel estimation unit again calculates the data channel gains according to the n-th input symbol in which the interference is cancelled and provides the data channel gains to the ICI estimation unit so that the iteration of interference cancellation is executed again.

12. The channel estimation device according to claim 8, further comprising:

an equalizing/quantifying unit for obtaining a plurality of original signals of the input signal through restoration according to the input signal and the data channel gains.

13. The channel estimation device according to claim 8, wherein the first multi-path statistical characteristic parameter is related to a multi-path average delay, and the second multi-path statistical characteristic parameter is related to a multi-path delay mean squared root.

14. The channel estimation device according to claim 13, wherein the channel estimation unit generates the adjusted first and second multi-path statistical characteristic parameters according to the following formula:

$$\begin{bmatrix} \tau_m(n+1) \\ \tau_{rms}(n+1) \end{bmatrix} = \begin{bmatrix} \tau_m(n) \\ \tau_{rms}(n) \end{bmatrix} - \Lambda \times \nabla J(\tau_m(n), \tau_{rms}(n))$$

$\tau_m(n)$ and $\tau_{rms}(n)$ respectively correspond to the first and the second multi-path statistical characteristic parameters of the n-th input symbol, $\tau_m(n+1)$ and $\tau_{rms}(n+1)$ respectively correspond to the first and the second multi-path statistical characteristic parameters of a next input symbol, and $\Lambda \times \Delta J(\tau_m(n), \tau_{rms}(n))$ denotes the adaptive alteration;

wherein, $\Lambda$ denotes a variation step unit of the first and the second multi-path statistical characteristic parameter, and can be expressed as the following matrix:

$$\Lambda = \begin{bmatrix} \lambda_m & 0 \\ 0 & \lambda_{rms} \end{bmatrix}$$

wherein, $\nabla J(\tau_m(n), \tau_{rms}(n))$ denotes the gradient of the function $J(\tau_m(n), \tau_{rms}(n))$ corresponding to $\tau_m(n)$ and $\tau_{rms}(n)$, and the function $J(\tau_m(n), \tau_{rms}(n))$ satisfies the following formula:

$$J(\tau_m, \tau_{rms}) = \|e\|^2 = \|H_d - W\tilde{H}_p\|^2$$

$H_d$ denotes an actual data channel gain vector, $\tilde{H}_p$ denotes a pilot channel gain vector, and W denotes the Wiener filter matrix.

15. The channel estimation device according to claim 8, wherein the reception unit comprises:

an antenna for receiving a wireless signal;

a cyclic prefix remover for receiving and outputting the wireless signal; and a fast Fourier transformer for generating the input signal according to the wireless signal provided by the cyclic prefix remover, so that the channel estimation device executes the operation of channel estimation in a frequency domain.

\* \* \* \* \*